(12) United States Patent
Li (10) Patent No.: US 10,512,042 B2
(45) Date of Patent: Dec. 17, 2019

(54) METHOD FOR TERMINAL TO TRANSMIT UPLINK SIGNAL, AND TERMINAL

(71) Applicant: Huawei Technologies Co., Ltd., Shenzhen, Guangdong (CN)

(72) Inventor: Qiang Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/183,158

(22) Filed: Feb. 18, 2014

(65) Prior Publication Data

US 2014/0162718 A1    Jun. 12, 2014

Related U.S. Application Data

(63) Continuation of application No. PCT/CN2012/079237, filed on Jul. 27, 2012.

(30) Foreign Application Priority Data

Aug. 17, 2011  (CN) .......................... 2011 1 0235910

(51) Int. Cl.
*H04W 52/14* (2009.01)
*H04W 52/32* (2009.01)
(Continued)

(52) U.S. Cl.
CPC ....... *H04W 52/146* (2013.01); *H04W 52/325* (2013.01); *H04W 52/40* (2013.01);
(Continued)

(58) Field of Classification Search
CPC ..... H04W 52/02; H04W 52/04; H04W 52/24; H04W 52/34; H04W 52/216;
(Continued)

(56) References Cited

U.S. PATENT DOCUMENTS

2007/0189234 A1\* 8/2007 Heo et al. ...................... 370/335
2008/0166976 A1\* 7/2008 Rao ................................ 455/69
(Continued)

FOREIGN PATENT DOCUMENTS

CN    101841778 A    9/2010
CN    102083189 A    6/2011
(Continued)

OTHER PUBLICATIONS

U.S. Appl. No. 61/351,306, filed Jun. 2010, Lee; Seungmin.\*
(Continued)

*Primary Examiner* — Yuwen Pan
*Assistant Examiner* — Paul P Tran
(74) *Attorney, Agent, or Firm* — Leydig, Voit & Mayer, Ltd.

(57) ABSTRACT

A method for a terminal to transmit an uplink signal includes: receiving an instruction sent by a serving base station and used for determining transmit power; selecting an uplink power control formula from a plurality of uplink power control formulas according to the instruction; obtaining transmit power of an uplink signal by using the selected uplink power control formula; and transmitting an uplink signal by using the transmit power. An uplink power control formula is selected from a plurality of uplink power control formulas according to an instruction of a serving base station, so that a terminal is not only capable of selecting, according to a receiving manner, a corresponding uplink power control formula to determine a transmit signal, but also capable of using a corresponding uplink power control formula for a different configuration parameter of a non-periodical SRS to determine suitable transmit power to transmit an uplink signal.

9 Claims, 4 Drawing Sheets (51) Int. Cl.
*H04W 52/40* (2009.01)
*H04W 52/24* (2009.01)
*H04W 52/28* (2009.01)

(52) U.S. Cl.
CPC ........ *H04W 52/242* (2013.01); *H04W 52/245* (2013.01); *H04W 52/28* (2013.01)

(58) Field of Classification Search
CPC ............. H04W 52/262; H04W 52/286; H04W 52/343; H04W 52/365; H04W 52/367; H04W 52/50; H04W 52/52; H04W 12/06; H04W 12/12; H04W 80/04; H04W 88/02; H04W 88/06; H04W 88/08; H04W 52/08; H04W 52/10; H04W 52/18; H04W 52/16; H04W 52/36; H04W 52/42; H04W 52/44; H04W 52/146; H04W 52/242; H04W 52/243; H04W 52/245; H04W 52/247; H04W 52/248; H04W 52/28; H04W 52/325; H04W 52/40; H04W 72/0413; H04W 72/14; H04L 1/0002; H04L 1/0003; H04L 1/1812; H04L 1/1822; H04L 27/2601; H04L 27/2647; H04L 43/50; H04L 5/0007; H04L 5/0048; H04L 5/0053; H04L 5/0001; H04L 5/0023; H04N 7/004; H04N 7/17309; H04N 7/17318; H04N 7/17354; H04N 21/6168; H04N 24/611; H04N 24/6118; H04B 7/0413; H04B 7/0689; H04B 7/0871
USPC ....... 455/203, 204, 208, 229, 230, 280, 244, 455/245, 310, 311, 318, 319, 320, 321, 455/328, 329, 331, 332, 333, 334, 335, 455/336, 337, 342, 343, 347, 348, 350, 455/377, 394, 395.4, 473, 506; 370/141, 370/150, 260; 375/13.4, 68, 69, 70, 84, 375/115, 125, 126, 127.1, 127.2, 134, 375/136, 137, 138, 343, 404.2, 405, 418, 375/419, 420, 440, 442, 447, 452.1, 375/452.2, 455, 456.1, 456.2, 515, 517, 375/522, 574
See application file for complete search history.

(56) References Cited

U.S. PATENT DOCUMENTS

| | | | | |
|---|---|---|---|---|
| 2008/0200202 | A1* | 8/2008 | Montojo et al. | 455/522 |
| 2008/0280638 | A1* | 11/2008 | Malladi | H04W 52/08 455/522 |
| 2010/0027471 | A1* | 2/2010 | Palanki | H04B 7/024 370/328 |
| 2010/0246463 | A1* | 9/2010 | Papasakellariou | H04W 52/146 370/311 |
| 2011/0096815 | A1* | 4/2011 | Shin | H04B 7/0689 375/219 |
| 2011/0098054 | A1* | 4/2011 | Gorokhov | H04B 7/024 455/452.1 |
| 2011/0269489 | A1* | 11/2011 | Khoshnevis | H04L 5/0048 455/507 |
| 2011/0312355 | A1* | 12/2011 | Cheng | G01S 5/0215 455/501 |
| 2012/0039273 | A1* | 2/2012 | Nam | H04L 5/0005 370/329 |
| 2012/0057516 | A1* | 3/2012 | Ahn | H04L 5/0048 370/312 |
| 2012/0113950 | A1* | 5/2012 | Skov | H04L 5/0016 370/329 |
| 2012/0115539 | A1 | 5/2012 | Zhang et al. | |
| 2012/0294162 | A1* | 11/2012 | Pajukoski | H04B 7/024 370/252 |
| 2013/0012252 | A1* | 1/2013 | Suzuki | H04W 52/325 455/509 |
| 2013/0039305 | A1* | 2/2013 | Kishiyama | H04W 72/1263 370/329 |
| 2013/0078913 | A1* | 3/2013 | Lee | H04L 5/0007 455/39 |
| 2013/0114562 | A1* | 5/2013 | Seo | H04W 52/146 370/329 |
| 2014/0080488 | A1* | 3/2014 | Michel | H04W 52/0206 455/436 |

FOREIGN PATENT DOCUMENTS

| | | |
|---|---|---|
| EP | 1628413 A2 | 2/2006 |
| WO | WO 2011041555 A2 | 4/2011 |
| WO | WO 2013070356 A1 | 5/2013 |

OTHER PUBLICATIONS

"UL power control for TDD eIMTA," 3GPP TSG RAN WG1 Meeting #73, Fukuoka, Japan, R1-132406, 3$^{rd}$ Generation Partnership Project, Valbonne, France (May 20-24, 2013).

"Uplink Power Control Considerations for CoMP," 3GPP TSG RAN WG1 Meeting RAN1#65, Barcelona, Spain, R1-111433, 3$^{rd}$ Generation Partnership Project, Valbonne, France (May 9-13, 2011).

* cited by examiner

METHOD FOR TERMINAL TO TRANSMIT UPLINK SIGNAL, AND TERMINAL

CROSS-REFERENCE TO RELATED APPLICATION

This application is a continuation of International Patent Application No. PCT/CN2012/079237, filed on Jul. 27, 2012, which claims priority to Chinese Patent Application No. 201110235910.4, filed on Aug. 17, 2011, both of which are hereby incorporated by reference in their entireties.

TECHNICAL FIELD

The present invention relates to the field of communications technologies, and in particular, to a method for a terminal to transmit an uplink signal and a terminal thereof, and a method for receiving an uplink signal transmitted by a terminal and a base station thereof.

BACKGROUND

On an uplink, that is, a link from a terminal to a base station, in a wireless communication system, a mobile terminal, for example, a user equipment (User Equipment, UE), needs to determine power for transmitting a signal, so that the power remains at a level suitable for reception by the base station when the signal sent by the mobile terminal arrives at the base station, for example, an evolved Node B (Evolved Node B, eNB). The determined power is transmit power.

When determining transmit power of an uplink signal, the mobile terminal specifically obtains the transmit power of the uplink signal according to its maximum transmit power, a measured downlink path loss, a power value expected by a serving base station for receiving a signal and notified by the serving base station, and the like, and transmits the uplink signal to the base station by using the power. After receiving the uplink signal, the base station feeds back a closed-loop power control compensation value to the mobile terminal, so that the mobile terminal adjusts the transmit power according to the closed-loop power control compensation value.

In the prior art, each cell has only one macro base station (that is, a primary base station) for receiving a signal sent by a served mobile terminal. In other words, an uplink signal is independently received by a serving base station in a cell where a mobile terminal is located, and transmit power of the uplink signal also only needs to be controlled to meet a power requirement for independent reception by the serving base station. That is, power control of the uplink signal aims at making the power to be at a level suitable for reception by a primary base station when the signal arrives at the primary base station.

With development of technologies, some new network topology structures make power control of an uplink signal no longer be able to meet various requirements. For example, in a cell, in addition to a macro base station, a plurality of micro base stations are deployed for jointly covering the entire cell. The micro base stations are used to cover hot-spot regions. The macro base station and the micro base stations are connected using high-speed optical cables, facilitating information interaction between them.

In addition, the macro base station in the cell and a macro base station in another cell may jointly receive a signal.

When a mobile terminal transmits an uplink signal, the uplink signal may be received by different base station sets. Existing methods for controlling transmit power of an uplink signal cannot meet requirements of a plurality of receiving manners.

For example, with respect to SRS reception, an SRS is an uplink reference signal transmitted by a terminal side to a base station side and used for channel measurement between a terminal and a bases station. The SRS can not only be used for measurement of an uplink channel but also be used for measurement of a downlink channel. However, with respect to a same terminal, a base station set (referred to as a set A below) for transmitting a downlink signal to the terminal may be different from a base station set (referred to as a set B below) for receiving an uplink signal from the terminal. In this way, if the SRS is used to perform measurement of an uplink channel, the set B receives the SRS, and power control should be adjusted according to a reception level of the set B; whereas if the SRS is used to perform measurement of a downlink channel, the set A receives the SRS, and the power control should be adjusted according to a reception level of the set A. In the prior art, only one power control process is employed, and therefore a power requirement for joint reception by a plurality of base stations cannot be met.

In addition, analogously, in a wireless communication system, time for a terminal side to transmit an uplink signal is controlled by a base station side, so as to achieve an optimal reception effect. In the prior art, when each individual cell has only one macro base station (that is, a primary base station) for receiving a signal sent by a served mobile terminal, the mobile terminal reserves a time advance (Time Advance, TA) value, and transmits an uplink signal to the macro base station at the time point TA.

However, with respect to a new network topology structure where an uplink signal of a mobile terminal may be jointly received by a plurality of base stations, existing time control methods for the uplink signal cannot meet time control requirements of a plurality of receiving manners

SUMMARY

Embodiments of the present invention provide a method for a terminal to transmit an uplink signal and a terminal thereof, and a method for receiving an uplink signal transmitted by a terminal and a base station thereof, to meet different uplink power control requirements in a plurality of receiving manners.

An embodiment of the present invention provides a method for a terminal to transmit an uplink signal, including:

receiving an instruction sent by a serving base station and used for determining transmit power;

selecting an uplink power control formula from a plurality of uplink power control formulas according to the instruction;

obtaining transmit power of an uplink signal by using the selected uplink power control formula; and transmitting an uplink signal by using the transmit power.

An embodiment of the present invention further provides a terminal, including:

an instruction receiving unit, configured to receive an instruction sent by a serving base station and used for determining transmit power;

a formula selecting unit, configured to select an uplink power control formula from a plurality of uplink power control formulas according to the instruction;

a transmit power acquiring unit, configured to obtain transmit power of an uplink signal by using the selected uplink power control formula; and a transmitting unit, configured to transmit an uplink signal by using the transmit power.

An embodiment of the present invention further provides a method for receiving an uplink signal transmitted by a terminal, including:

selecting an uplink power control formula from a plurality of uplink power control formulas according to a receiving manner in which a base station side receives an uplink signal;

sending, based on the selected uplink power control formula, an instruction for determining transmit power to a terminal, where the instruction is used for instructing the terminal to obtain transmit power of an uplink signal by using the selected uplink power control formula; and receiving an uplink signal sent by the terminal.

An embodiment of the present invention further provides a base station, including:

a formula selecting unit, configured to select an uplink power control formula from a plurality of uplink power control formulas according to a receiving manner in which a base station side receives an uplink signal;

an instructing unit, configured to send, based on the selected uplink power control formula, an instruction for determining transmit power to a terminal, where the instruction is used for instructing the terminal to obtain transmit power of an uplink signal by using the selected uplink power control formula; and an uplink signal receiving unit, configured to receive an uplink signal sent by the terminal.

According to the method for a terminal to transmit an uplink signal and the terminal thereof, and the method for receiving an uplink signal transmitted by a terminal and the base station thereof that are provided in the embodiments of the present invention, an uplink power control formula is selected from a plurality of uplink power control formulas according to an instruction of a serving base station, so that a terminal is not only capable of selecting, according to a receiving manner, a corresponding uplink power control formula to determine a transmit signal, but also capable of using a corresponding uplink power control formula for a different configuration parameter of a non-periodical SRS to determine suitable transmit power to transmit an uplink signal. In this way, power control requirements in current different receiving manners are met, flexibility of uplink transmit power control of the terminal is improved, and signal transmission performance of the terminal is also improved.

An embodiment of the present invention further provides a method for a terminal to transmit an uplink signal, including:

receiving an instruction sent by a serving base station and used for determining a time advance value, where the instruction is determined by the serving base station according to a receiving manner in which a base station side receives an uplink signal;

selecting a time advance value from a plurality of time advance values according to the instruction; and transmitting an uplink signal to the serving base station at an advanced time point corresponding to the selected time advance value.

An embodiment of the present invention further provides a terminal, including:

a time instruction receiving unit, configured to receive an instruction sent by a serving base station and used for determining a time advance value, where the instruction is determined by the serving base station according to a receiving manner in which a base station side receives an uplink signal;

a time selecting unit, configured to select a time advance value from a plurality of time advance values according to the instruction; and a transmitting unit, configured to transmit an uplink signal to the serving base station at an advanced time point corresponding to the selected time advance value.

An embodiment of the present invention further provides a method for receiving an uplink signal transmitted by a terminal, including:

selecting a time advance value from a plurality of time advance values according to a receiving manner in which a base station side receives an uplink signal;

sending, based on the selected time advance value, an instruction for determining a time advance value to a terminal, where the instruction is used for instructing the terminal to transmit an uplink signal at an advanced time point corresponding to the selected time advance value; and receiving the uplink signal sent by the terminal.

An embodiment of the present invention further provides a base station, including:

a time selecting unit, configured to select a time advance value from a plurality of time advance values according to a receiving manner in which a base station side receives an uplink signal;

an instructing unit, configured to send, based on the selected time advance value, an instruction for determining a time advance value to a terminal, where the instruction is used for instructing the terminal to transmit an uplink signal at an advanced time point corresponding to the selected time advance value; and an uplink signal receiving unit, configured to receive the uplink signal sent by the terminal.

According to the method for a terminal to transmit an uplink signal and the terminal thereof, and the method for receiving an uplink signal transmitted by a terminal and the base station thereof that are provided in the embodiments of the present invention, a serving base station sends, according to a receiving manner of a base station side, an instruction to instruct a terminal to select a TA value, so that the terminal is capable of transmitting an uplink signal at suitable time. In this way, time control requirements of new network topology structures such as a plurality of base stations jointly covering a cell are met.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In an LTE-A (further evolution of long term evolution) system, with respect to an uplink signal, an uplink physical layer control channel (PUCCH), an uplink physical layer shared channel (PUSCH), and an uplink sounding reference signal (SRS) all need to determine suitable transmit power for transmission, so as to ensure that the power is suitable for reception when the uplink signal arrives at a base station.

With respect to a PUCCH, a UE calculates transmit power of the PUCCH by using the following uplink power control formula:

$$P_T = \min\{P_{max}, P_0 + PL_{DL} + \Delta_{Format} + \delta\} \quad (1)$$

In the formula, $P_T$ is transmit power; $P_{max}$ is a maximum transmit power of the UE (the transmit power of the UE will not exceed $P_{max}$); $P_0$ is a target power value, that is, a power value desired by an eNB for receiving a signal, where the power value is notified by the eNB to the UE; $PL_{DL}$ is a downlink path loss, which is measured and obtained by the UE, and it is assumed that the downlink path loss is equal to an uplink path loss; $\Delta_{Format}$ is a compensation value for the PUCCH in a different format, which is notified by the eNB to the UE; and $\delta$ is a closed-loop power control compensation value, which is notified by the eNB to the UE and may be frequently changed against $P_0$ and $\Delta_{Format}$, so that the UE adjusts upwards or downwards the transmit power whenever necessary to achieve a purpose of rapid power control.

Before sending the PUCCH, the UE determines the transmit power $P_T$ of the PUCCH according to the uplink power control formula (1), and then transmits the PUCCH by using the determined transmit power $P_T$.

Power control of a PUSCH uses the following uplink power control formula:

$$P_T = \min\{P_{max}, P_0 + \alpha PL_{DL} + 10 \log_{10}(M) + \Delta_{MCS} + \delta\} \quad (2)$$

In the formula, $P_T$, $P_{max}$, $P_0$, $PL_{DL}$, and $\delta$ denote the same meanings as in the uplink power control formula (1). $\alpha$ is a path loss compensation coefficient, which is notified by the eNB to the UE; M is a bandwidth allocated to the PUSCH, which is notified by the eNB to the UE; and $\Delta_{MCS}$ is a compensation value used with respect to a different modulation coding scheme (MSC), which is notified by the eNB to the UE. Before sending the PUSCH, the UE needs to first determine the transmit power $P_T$ of the PUSCH according to the uplink power control formula (2).

Power control of an SRS uses the following uplink power control formula:

$$P_T = \min\{P_{max}, P_0 + \alpha PL_{DL} + 10 \log_{10}(M_{SRS}) + \delta + P_{SRS}\} \quad (3)$$

In the formula, $P_T$, $P_{max}$, $P_0$, $PL_{DL}$, $\alpha$ and $\delta$ denote the same meanings as in the uplink power control formula (1) and the uplink power control formula (2). $M_{SRS}$ is a bandwidth allocated to the SRS, which is notified by the eNB to the UE; and $P_{SRS}$ is a configurable power compensation value with respect to the SRS, which is notified by the eNB to the UE. Before sending the SRS, the UE needs to first determine the transmit power $P_T$ of the SRS according to the uplink power control formula (3).

Figure 1:
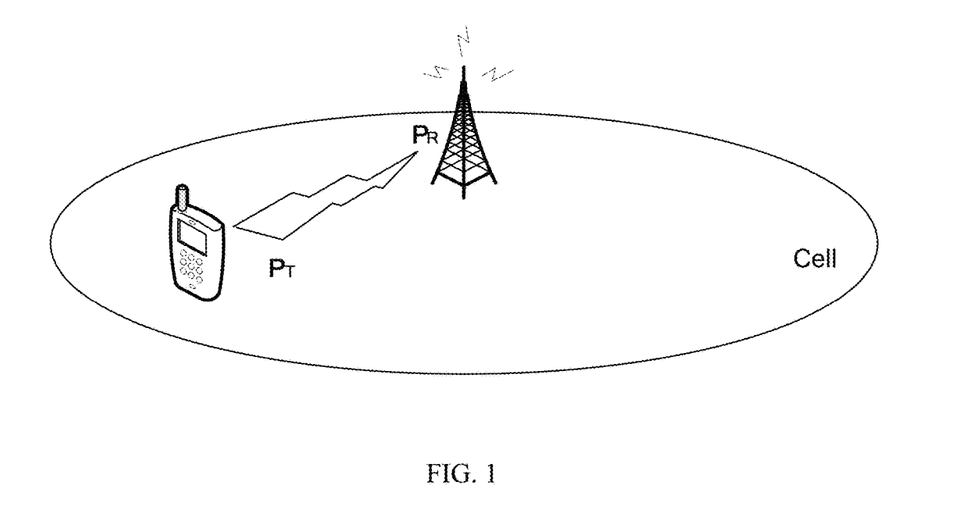
FIG. 1 is a schematic topology diagram of a traditional cell.

Details above are directed to a scenario where an uplink signal is independently received by a serving base station. As illustrated in FIG. 1, transmit power of the uplink signal is determined, so that the uplink signal is transmitted by using the determined transmit power $P_T$, and receive power $P_R$ at a macro base station is at a level suitable for reception.

Figure 2:
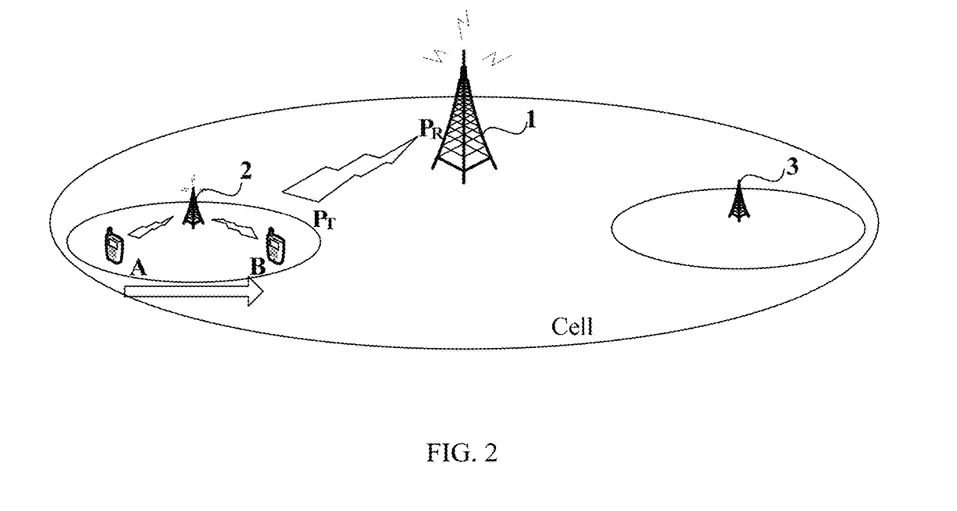
FIG. 2 is a schematic topology diagram of a heterogeneous network.

When a cell has one primary base station and a plurality of micro base stations, with respect to an uplink signal transmitted by a UE, in some occasions, a base station set A receives the uplink signal, whereas in other occasions, a base station set B receives the uplink signal. For example, with respect to an SRS, if the SRS is directed to measurement of an uplink channel, a base station set responsible for receiving uplink data of the terminal receives the uplink signal; and if the SRS is directed to measurement of a downlink channel, a base station set responsible for sending downlink data to the terminal receives the uplink signal. Still for example, as illustrated in FIG. 2, a macro base station 1 is the primary base station in the cell, and covers the entire cell, whereas a micro base station 2 is used to cover a hot-spot region. The UE performs uplink transmission; if the UE is located at a position A, a receive signal is received only by the micro base station 2. In this case, power control targets at suitable power when the uplink signal arrives at the micro base station 2. However, when the UE moves to a position B, the uplink signal is received by the macro base station 1 and the micro base station 2 jointly. In this case, the power control targets at power suitable for joint reception by the micro base station 2 and the macro base station 1. To make power still suitable for reception when an uplink signal transmitted by a mobile terminal arrives at receiving base stations, the mobile terminal transmits the uplink signal by using the method illustrated in FIG. 3.

Figure 3:
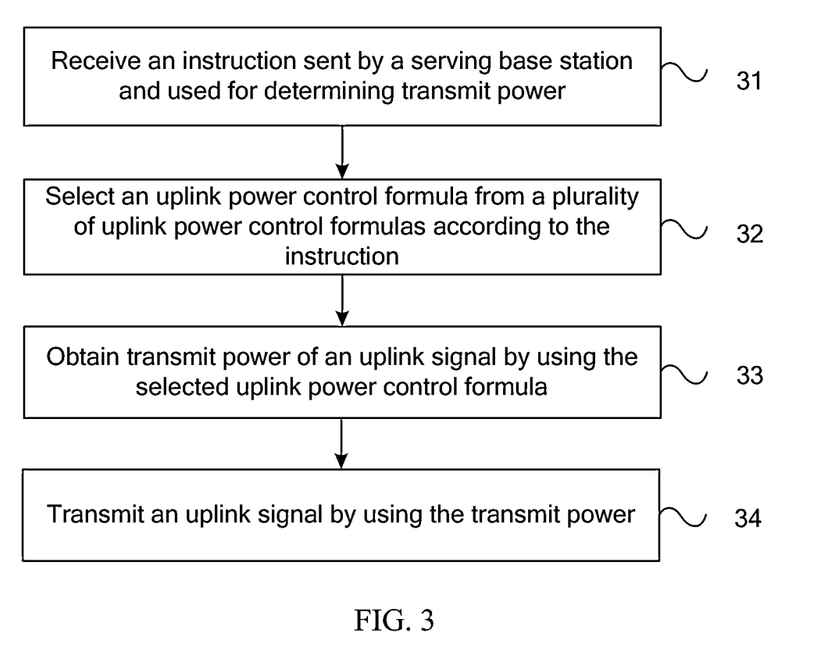
FIG. 3 is a flowchart of a method for a terminal to transmit an uplink signal according to an embodiment of the present invention.

FIG. 3 is a flowchart of a method for a terminal to transmit an uplink signal according to an embodiment of the present invention. As illustrated in FIG. 3, the method includes the following steps:

Step 31: Receive an instruction sent by a serving base station and used for determining transmit power.

The instruction may directly indicate which uplink power control formula a terminal uses, and the instruction may be determined by the serving base station according to a receiving manner in which a base station side receives an uplink signal. Alternatively, the instruction may be a configuration parameter of a non-periodical SRS. The configuration parameter is used to determine how to transmit the SRS and includes period and time information, a frequency domain position, and a bandwidth of the SRS, cyclic shift and comb teeth information used by the SRS, and the number of antennas of the SRS. For example, a downlink PDCCH delivered by the serving base station is received; and the configuration parameter of the non-periodical SRS is learned according to an information bit preset in the downlink PDCCH, or the configuration parameter of the non-periodical SRS is learned according to a DCI format of the downlink PDCCH. The receiving manner may include independent reception by a serving base station and joint reception by a serving base station and another base station.

Step 32: Select an uplink power control formula from a plurality of uplink power control formulas according to the instruction. For example, an uplink power control formula is selected, according to the instruction, from a plurality of uplink power control formulas with variables totally independently configured; or an uplink power control formula is selected, according to the instruction, from a plurality of uplink power control formulas with variables partially independently configured; or an uplink power control formula is selected, according to the instruction, from a plurality of uplink power control formulas with identical variables but carrying different offsets. For example, with respect to $P_T = \min\{P_{max}, P_0 + PL_{DL} + \Delta_{Format} + \delta\}$, totally independent configuration refers to that in a plurality of such formulas, values of variables P_max, P_0, PL_dl, delta, and sigma of each formula are independently set. That is, identical variables in a plurality of formulas may have different values.

Partial independence refers to, for example, that several formulas use a same P_max, but the remaining variables are independently configured. That is, the remaining variables may be independently set in each of the formulas and have different values.

Different offsets refer to that each of a plurality of formulas has $P_T = \min\{P_{max}, P_0 + PL_{DL} + \Delta_{Format} + \delta\}$, and identical variables in the plurality of formulas have identical values. In addition, an offset is added to the plurality of formulas. For details, reference may be made to the description in Embodiment 3.

Step 33: Obtain transmit power of an uplink signal by using the selected uplink power control formula.

Step 34: Transmit an uplink signal by using the transmit power.

According to this embodiment, an uplink power control formula is selected from a plurality of uplink power control formulas according to an instruction of a serving base station, so that a terminal is not only capable of selecting, according to a receiving manner, a corresponding uplink power control formula to determine a transmit signal, but also capable of using a corresponding uplink power control formula for a different configuration parameter of a non-periodical SRS to determine suitable transmit power to transmit an uplink signal. In this way, power control requirements in current different receiving manners are met, flexibility of uplink transmit power control of the terminal is improved, and signal transmission performance of the terminal is also improved.

Steps 31 to 34 may be performed by the terminal.

A process of obtaining transmit power of a current uplink signal by using the selected uplink power control formula further includes:

receiving respective target receive power transmitted by base stations jointly receiving the uplink signal; and obtaining, by using the selected uplink power control formula and the target receive power transmitted by the base stations, transmit power of the uplink signal suitable for joint reception.

For example, there are N base stations, whose target power is respectively $P_1, P_2, \ldots,$ and $P_N$, and path losses thereof are respectively $PL_1, PL_2, \ldots, PL_N$. In this case, a terminal side obtains, by calculation using the N target powers $P_1, P_2, \ldots,$ and $P_N$ sent by the N base stations, target power $$\frac{mean(P_1, P_2, \ldots P_N)}{N}$$

for joint reception by the N base stations, and further obtains the transmit power by calculation using the following uplink power control formula:

$$P_T = \min\left\{P_{max}, \frac{mean(P_1, P_2 \ldots P_N)}{N} + mean(PL_1, PL_2 \ldots PL_N) + \frac{mean(\Delta_1, \Delta_2 \ldots \Delta_N)}{N} + \frac{mean(\delta_1, \delta_2 \ldots \delta_N)}{N}\right\},$$

where mean( ) indicates an average value within the bracket.

Alternatively, the process of obtaining the transmit power of the current uplink signal by using the selected uplink power control formula further includes:

receiving a target power value that is sent by the serving base station and suitable for joint reception, where the target power value is obtained by negotiation by the base stations jointly receiving the uplink signal;

obtaining, by using the selected uplink power control formula and the received target power value, transmit power suitable for joint reception. That is, the target power suitable for joint reception has been obtained by the base station side in a manner the same as the calculation by the terminal side. The base station sends a result obtained by calculation to the terminal.

Accordingly, a method for receiving an uplink signal transmitted by a terminal according to an embodiment of the present invention includes:

selecting an uplink power control formula from a plurality of uplink power control formulas according to a receiving manner in which a base station side receives an uplink signal; where for details of the uplink power control formula, reference may be made to the description in the embodiment illustrating the method for transmitting an uplink signal;

sending, based on the selected uplink power control formula, an instruction for determining transmit power to a terminal, where the instruction is used for instructing the terminal to obtain transmit power of an uplink signal by using the selected uplink power control formula; and for details of the instruction for determining transmit power, reference may be made to the description in the embodiment illustrating the method for transmitting an uplink signal; and receiving an uplink signal sent by the terminal.

The foregoing steps may be performed by a serving base station of the terminal transmitting the uplink signal.

Alternatively, the sending an instruction for determining transmit power to a terminal includes: the sending a physical downlink control channel PDCCH to the terminal, where an information bit preset in the downlink PDCCH serves as the instruction, or a DCI format of the downlink PDCCH serves as the instruction.

The method for transmitting an uplink signal and the method for receiving an uplink signal are further described in detail with reference to Embodiment 1 to Embodiment 4.

Embodiment 1

This embodiment uses the scenario illustrated in FIG. 2 as an application environment of a method for a mobile terminal to transmit an uplink signal, where the mobile terminal is a UE, and a serving base station is a micro base station 2.

A plurality of uplink power control formulas are set in the UE for each category of uplink signals, an eNB determines an instruction according to a manner of receiving an uplink signal, so that the UE selects, according to the instruction determined by the eNB, a corresponding uplink power control formula to determine transmit power of an uplink signal.

For example, with respect to an uplink PUCCH, the UE may set two uplink power control formulas:

$$P_{T1} = \min\{P_{max}, P_{0,1} + PL_{DL,1} + \Delta_{Format,1} + \delta_1\} \quad (41)$$

$$P_{T2} = \min\{P_{max}, P_{0,2} + PL_{DL,2} + \Delta_{Format,2} + \delta_2\} \quad (42)$$

The uplink power control formula (41) is used by the UE to determine transmit power $P_{T1}$ of the uplink PDCCH when the micro base station 2 independently receives an uplink signal transmitted by the terminal; the uplink power control formula (42) is used by the UE to determine transmit power $P_{T2}$ of the uplink PDCCH when a macro base station 1 and the micro base station 2 jointly receive the uplink signal; $P_{0,1}$ is target power for the micro base station 2 to independently receive the uplink signal, that is, power of the uplink PDCCH that the micro base station 2, when independently receiving the uplink signal, expects to receive; $P_{0,2}$ is target power for joint reception, that is, total receive power that the macro base station 1 and the micro base station 2, when jointly receiving the uplink PDCCH, expect to receive; $PL_{DL,1}$ is a path loss with respect to independent reception, and $PL_{DL,2}$ is a path loss with respect to joint reception, which are both obtained by the UE by measurement; $\Delta_{Format,1}$ is a PUCCH format compensation value for independent reception, and $\Delta_{Format,2}$ is a PUCCH format compensation value for joint reception, which are both independently configured by the eNB; and $\delta_1$ and $\delta_2$ are closed-loop power control compensation values, which are independently controlled by the eNB.

After obtaining the transmit power of the uplink PDCCH by using the uplink power control formula (41) or the uplink power control formula (42), the UE transmits the uplink PDCCH by using the obtained transmit power.

In this embodiment, the variables $P_0$ and $\Delta_{Format}$ in each of the uplink power control formulas are both independently configured; the UE measures $PL_{DL,1}$ and $PL_{DL,2}$ respectively; and two independent uplink power control formulas are used to determine $\delta_1$ and $\delta_2$. In this way, the two uplink power control formulas are set respectively for two reception scenarios. Before instructing the UE to transmit the uplink signal, the eNB may first judge whether the uplink signal is to be independently received by the micro base station 2 or to be jointly received by the primary base station 1 and the micro base station 2, and then notify, by using downlink signaling, the UE that which uplink power control formula is to be used to determine the transmit power of the uplink signal. The UE learns an applicable uplink power control formula according to the downlink signaling. In the case of independent reception, the eNB instructs the UE to only acquire receive power expected by the micro base station 2 and a path loss between the UE and the micro base station 2; the transmit power of the uplink signal may be determined by using the uplink power control formula (41); and the uplink signal is transmitted by using the determined transmit power. In the case of joint reception, the eNB instructs the UE to determine, by using the uplink power control formula (42), transmit power suitable for joint reception by the primary base station 1 and the micro base station 2, and transmit the uplink signal by using the determined transmit power.

With respect to an uplink PUSCH, the UE also sets an uplink power control formula suitable for independent reception and an uplink power control formula suitable for joint reception. The details are shown in the following uplink power control formulas:

$$P_{T1} = \min\{P_{max}, P_{0,1} + \alpha_1 PL_{DL,1} + 10\log_{10}(M_1) + \Delta_{MCS,1} + \delta_1\} \quad (51)$$

$$P_{T2} = \min\{P_{max}, P_{0,2} + \alpha_2 PL_{DL,2} + 10\log_{10}(M_2) + \Delta_{MCS,2} + \delta_1\} \quad (52)$$

Assume that the uplink power control formula (51) is suitable for independent reception, and is an uplink power control formula set for a case where the micro base station 2 independently receives the uplink signal; and the uplink power control formula (52) is suitable for joint reception, and is an uplink power control formula set for a case where the macro base station 1 and the micro base station 2 jointly receive the uplink signal. $P_0$, $\Delta_{MCS}$, and $\alpha$ in the uplink power control formula (51) and the uplink power control formula (52) are independently configured; $PL_{DL,1}$ and $PL_{DL,2}$ are obtained by the UE by respectively measuring the macro base station 1 and the micro base station 2; and $\delta_1$ and $\delta_2$ are respectively determined by two independent closed-loop power control processes of independent reception and joint reception.

With respect to two reception scenarios, that is, two receiving manners, before instructing the UE to send the uplink PUSCH, the eNB first judges whether the uplink signal is to be independently received by the micro base station 2 or to be jointly received by the primary base station 1 and the micro base station 2, and then notifies, by using downlink signaling, the UE that which uplink power control formula is to be used to determine the transmit power of the uplink signal. The UE selects one formula from the uplink power control formula (51) and the uplink power control formula (52) according to the downlink signaling, obtains the transmit power by using the selected formula, and transmits the uplink PUSCH by using the obtained transmit power.

With respect to an uplink SRS, the UE also sets an uplink power control formula suitable for independent reception and an uplink power control formula suitable for joint reception. The details are shown in the following uplink power control formulas:

$$P_{T1} = \min\{P_{max}, P_{0,1} + \alpha_1 PL_{DL,1} + 10\log_{10}(M_{SRS,1}) + \delta_1 + P_{SRS,1}\} \quad (61)$$

$$P_{T2} = \min\{P_{max}, P_{0,2} + \alpha_2 PL_{DL,2} + 10\log_{10}(M_{SRS,2}) + \delta_2 + P_{SRS,2}\} \quad (62)$$

Assume that the uplink power control formula (61) is suitable for independent reception, and is an uplink power control formula set for the case where the micro base station 2 independently receives the uplink signal; and the uplink power control formula (62) is suitable for joint reception, and is an uplink power control formula set for the case where the macro base station 1 and the micro base station 2 jointly receive the uplink signal. $P_0$, $P_{SRS}$, and $\alpha$ in the uplink power control formula (61) and the uplink power control formula (62) are independently configured; $PL_{DL,1}$ and $PL_{DL,2}$ are respectively measured by the UE on the macro base station 1 and the micro base station 2; and $\delta_1$ and $\delta_2$ are respectively determined by two independent closed-loop power control processes of independent reception and joint reception.

With respect to two reception scenarios, before instructing the UE to send the uplink SRS, the eNB first judges whether the uplink signal is to be independently received by the micro base station 2 or to be jointly received by the primary base station 1 and the micro base station 2, and then notifies, by using downlink signaling, the UE that which uplink power control formula is to be used to determine the transmit power of the uplink signal. The UE acquires a corresponding parameter according to the downlink signaling, obtains a manner of receiving the uplink SRS, selects one formula from the uplink power control formula (61) and the uplink power control formula (62) according to the downlink signaling, obtains the transmit power by using the selected formula, and transmits the uplink SRS by using the obtained transmit power.

Embodiment 2

Analogous to Embodiment 1, a plurality of uplink power control formulas are set in a UE for each category of uplink signals. However, each of the uplink power control formulas is merely for independent closed-loop control, and another variable in each uplink power control formula is likewise configured.

With respect to an uplink PUCCH, transmit power of the uplink PUCCH is determined by using the following uplink power control formulas:

$$P_{T1} = \min\{P_{max}, P_0 + PL_{DL} + \Delta_{Format} + \delta_1\} \quad (71)$$

$$P_{T2} = \min\{P_{max}, P_0 + PL_{DL} + \Delta_{Format} + \delta_2\} \quad (72)$$

As can be seen from the uplink power control formula (71) and the uplink power control formula (72), $P_0$ and $\Delta_{Format}$ in different uplink power control formulas are identically configured, and the UE uses an identical path loss to estimate $PL_{DL}$. However, closed-loop power control is independently performed in each process. That is, $\delta_1$ and $\delta_2$ are independently adjusted, and $\delta$ in each of the uplink power control formulas is adjusted to a value suitable for a receiving manner thereof by using the closed-loop power control. That is, with respect to a different receiving manner, an uplink power control formula corresponding to a value of $\delta$ needs to be selected. Likewise, before instructing the UE to transmit an uplink PDCCH, the eNB notifies the UE that which uplink power control formula is to be used to determine transmit power of the uplink PDCCH. The UE selects an uplink power control formula corresponding to the value of $\delta$ from the uplink power control formula (71) and the uplink power control formula (72) according to downlink signaling, obtains, by using the selected uplink power control formula, the transmit power for transmitting the uplink PDCCH, and transmits the uplink PDCCH by using the obtained transmit power.

With respect to an uplink PUSCH, transmit power of the uplink signal is determined by using the following uplink power control formulas:

$$P_{T1} = \min\{P_{max}, P_0 + \alpha PL_{DL} + 10 \log_{10}(M) + \Delta_{MCS} + \delta_1\} \quad (81)$$

$$P_{T2} = \min\{P_{max}, P_0 + \alpha PL_{DL} + 10 \log_{10}(M) + \Delta_{MCS} + \delta_2\} \quad (82)$$

As can be seen from the uplink power control formula (81) and the uplink power control formula (82), $P_0$, $\alpha$, and $\Delta_{MCS}$ in different uplink power control formulas are identically configured, and the UE uses an identical path loss to estimate $PL_{DL}$. However, closed-loop power control is independently performed in each process. That is, $\delta_1$ and $\delta_2$ are independently adjusted, and $\delta$ in each of the uplink power control formulas is adjusted to a value suitable for a receiving manner thereof by using the closed-loop power control. That is, with respect to a different receiving manner, an uplink power control formula corresponding to a value of $\delta$ needs to be selected. Likewise, before instructing the UE to transmit an uplink PUSCH, the eNB notifies the UE that which uplink power control formula is to be used to determine transmit power of the uplink PUSCH. The UE selects an uplink power control formula corresponding to the value of $\delta$ from the uplink power control formula (81) and the uplink power control formula (82) according to downlink signaling, obtains, by using the selected uplink power control formula, the transmit power for transmitting the uplink PUSCH, and transmits the uplink PUSCH by using the obtained transmit power.

With respect to an uplink SRS, transmit power of the uplink signal is determined by using the following uplink power control formulas:

$$P_{T1} = \min\{P_{max}, P_0 + \alpha PL_{DL} + 10 \log_{10}(M_{SRS}) + \delta_1 + P_{SRS}\} \quad (91)$$

$$P_{T2} = \min\{P_{max}, P_0 + \alpha PL_{DL} + 10 \log_{10}(M_{SRS}) + \delta_2 + P_{SRS}\} \quad (92)$$

As can be seen from the uplink power control formula (91) and the uplink power control formula (92), $P_0$, $\alpha$, and $P_{SRS}$ in different uplink power control formulas are identically configured, and the UE uses an identical path loss to estimate $PL_{DL}$. However, closed-loop power control is independently performed in each process. That is, $\delta_1$ and $\delta_2$ are independently adjusted, and $\delta$ in each of the uplink power control formulas is adjusted to a value suitable for a receiving manner thereof by using the closed-loop power control. That is, with respect to a different receiving manner, an uplink power control formula corresponding to a value of $\delta$ needs to be selected. Likewise, before instructing the UE to transmit an uplink SRS, the eNB notifies the UE that which uplink power control formula is to be used to determine transmit power of the uplink SRS. The UE selects an uplink power control formula corresponding to the value of $\delta$ from the uplink power control formula (91) and the uplink power control formula (92) according to downlink signaling, obtains, by using the selected uplink power control formula, transmit power for transmitting the uplink SRS, and transmits the uplink SRS by using the obtained transmit power.

Embodiment 3

This embodiment simplifies the description as compared against the above-described two embodiments. In this embodiment, a plurality of uplink power control formulas are set in each UE. With respect to these uplink power control formulas, one uplink power control formula is used as a reference therefor, and another uplink power control formula is obtained by adding a compensation value, that is, an offset, on the reference.

For example, in a UE, two uplink power control formulas are set for an uplink PUCCH, where one uplink power control formula, for example, an uplink power control formula (1), is used as a reference. Assume that transmit power calculated by using the reference, that is, the uplink power control formula (1), is $P_{T1}$, and then the other uplink power control formula is obtained by adding a compensation value on the uplink power control formula (1), that is, $P_{T2} = P_{T1} + \Delta_{procedure}$. $\Delta_{procedure}$ is the compensation value, that is, an offset. This compensation value may be obtained by measuring receive power of an uplink signal, or may be adjusted by using upper-layer signaling.

The UE selects, according to an instruction of a serving base station, one formula from the two uplink power control formulas to obtain transmit power, and transmits an uplink PDCCH by using the obtained transmit power.

Analogously, with respect to an uplink PUSCH and an uplink SRS, a plurality of uplink power control formulas are also set respectively. The uplink power control formulas have identical variables but different offsets. A transmission method is analogous to that of the uplink PDCCH.

Each of the uplink power control formulas have some variables, for example, $P_0$, $\Delta_{Format}$, $PL_{DL}$, and $\delta$ in uplink power control formulas of the uplink PUCCH. Those skilled in the art should understand that part of or all the parameter variables in a plurality of uplink power control formulas of each category of uplink signals may use the same configuration, and the remaining parameter variables use independent configuration. Alternatively, different uplink power control formulas may be formed, for example, $P_0$ and $\delta$ are independent of each other in the uplink power control formulas. That is, and $P_0$ and $\delta$ in each of the uplink power control formulas both have different values, whereas $\Delta_{Format}$ and $PL_{DL}$ in each of the uplink power control formulas both have the same values. Similar configurations may be made to parameter variables in uplink power control formulas of the uplink PUSCH and the uplink SRS.

Embodiment 4

In this embodiment, a mobile terminal is used to transmit an uplink non-periodic SRS. The non-periodic SRS is a special SRS. Before instructing a UE to transmit a non-periodic SRS, a serving base station first configure a plurality of groups of configuration parameters of the non-periodic SRS for the mobile terminal. Afterward, when the serving base station requires the mobile terminal to send the non-periodic SRS, the serving base station instructs, by using a downlink PDCCH, the mobile terminal to send the SRS, and notifies, by using the PDCCH, that which group of configuration parameters are to be used for transmission. For example, an information bit is added in the PDCCH, and the information bit is used to notify the mobile terminal that which group of configuration parameters is to be used for transmitting the non-periodic SRS, or a downlink control information (Downlink Control Information: DCI) format of the PDCCH is used to notify the mobile terminal that which group of configuration parameters is to be used for transmitting the non-periodic SRS. After obtaining an instruction indicating that which group of configuration parameters is to be used for transmitting the non-periodic SRS, the mobile terminal selects a corresponding uplink power control formula from a plurality of uplink power control formulas, obtains transmit power of the non-periodic SRS by using the selected uplink power control formula, and transmits the non-periodic SRS by using the obtained transmit power.

Generally, the non-periodic SRS has only one uplink power control formula. That is, regardless of which group of configuration parameters that is to be used, the same uplink power control formula is used for power control.

In this embodiment, the serving base station and the mobile terminal bind configuration parameters of the non-periodic SRS to a corresponding uplink power control formula; when selecting the configuration parameters of the non-periodic SRS, the serving base station accordingly selects the corresponding uplink power control formula; and when sending the configuration parameters to the mobile terminal, the serving base station instructs the mobile terminal to select which uplink power control formula. In this way, when triggering the non-periodic SRS, the serving base station automatically selects an uplink power control formula once selecting a group of configuration parameters. The mobile terminal selects a corresponding uplink power control formula from a plurality of uplink power control formulas by using the configuration parameters instructed by the serving base station, obtains the transmit power, and transmits the non-periodic SRS by using the obtained transmit power.

Those skilled in the art should understand that with respect to an uplink signal, more than two uplink power control formulas may be set for a mobile terminal, for example, joint reception may be joint reception by two base stations, joint reception by three base stations, joint reception by four base stations, and so on. With respect to each joint reception, a different uplink power control formula is used to determine transmit power of the uplink signal. In this way, plus the uplink power control formulas for independent reception, there are three uplink power control formulas, four uplink power control formulas, five uplink power control formulas, and so on.

Figure 4:
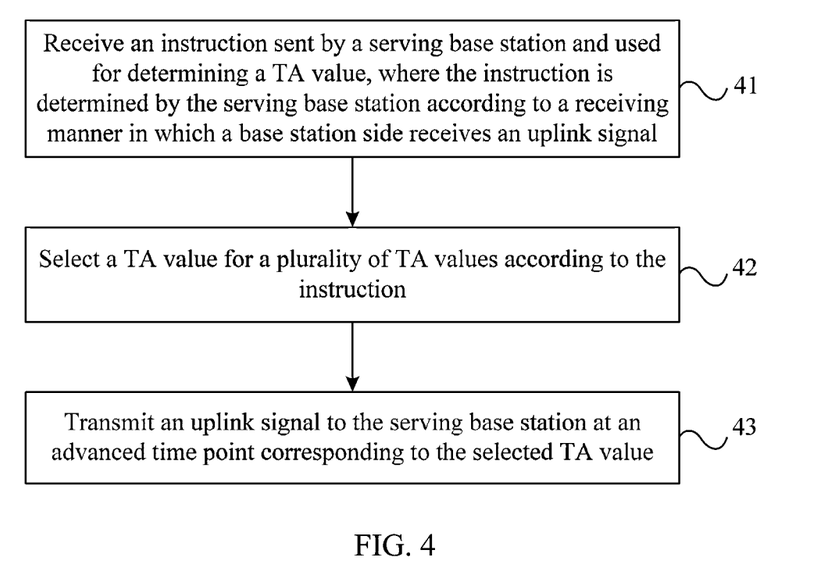
FIG. 4 is a flowchart of another method for a terminal to transmit an uplink signal according to an embodiment of the present invention.

FIG. 4 is a flowchart of another method for a terminal to transmit an uplink signal according to an embodiment of the present invention. As illustrated in FIG. 4, the method for a terminal to transmit an uplink signal includes the following steps:

Step 41: Receive an instruction sent by a serving base station and used for determining a TA value, where the instruction is determined by the serving base station according to a receiving manner in which a base station side receives an uplink signal.

Step 42: Select a TA value for a plurality of TA values according to the instruction.

Step 43: Transmit an uplink signal to the serving base station at an advanced time point corresponding to the selected TA value.

Figure 5:
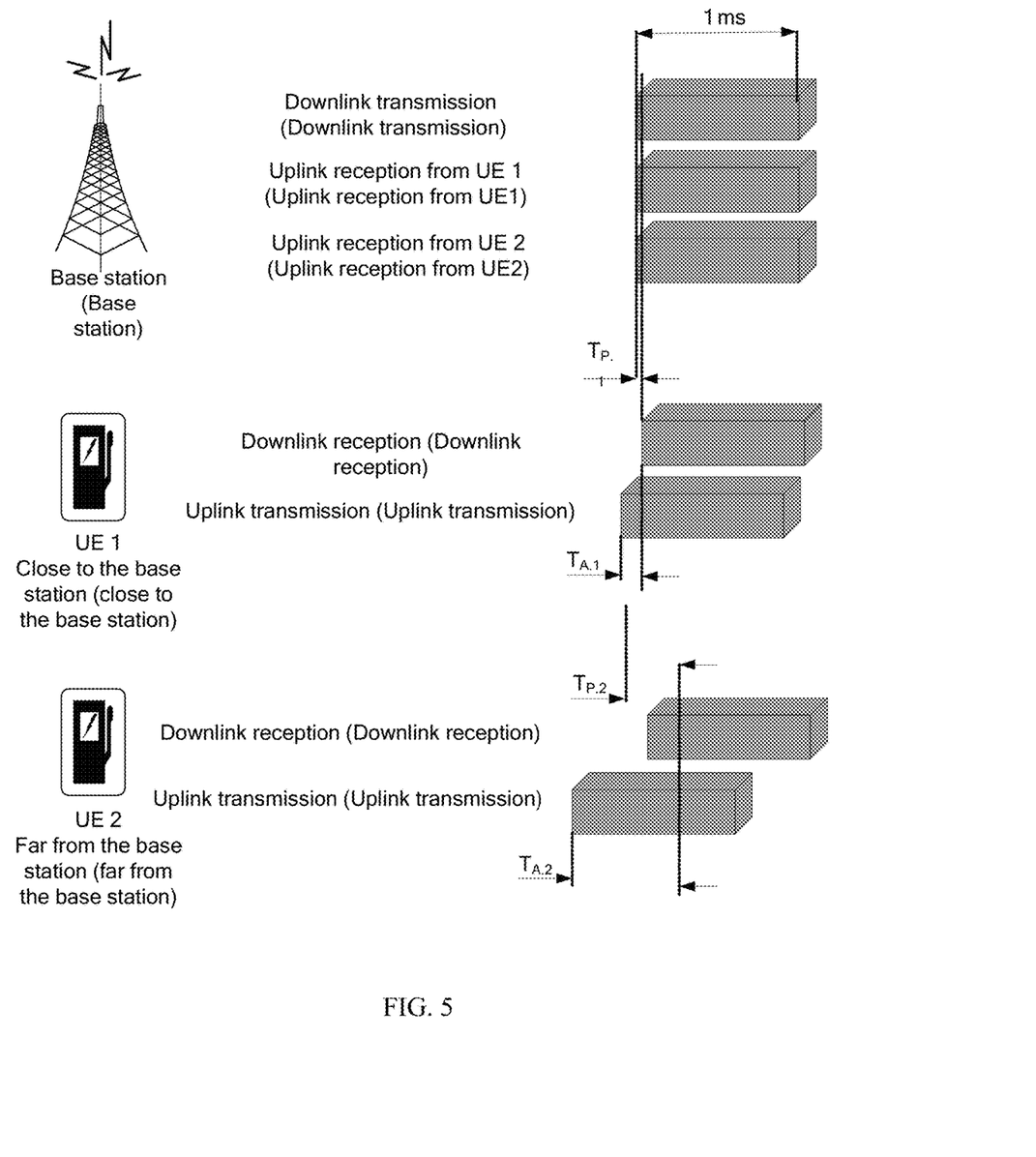
FIG. 5 is a schematic diagram of time for transmitting and receiving uplink and downlink signals.

As illustrated in FIG. 5, when a base station side sends a signal, due to wave propagation delays, a mobile terminal UE 1 closer to the base station will receive the signal a period of T_p1 later, and a mobile terminal UE 2 will receive the signal a period of T_p2 later. T_p2 is greater than T_p1.

When sending an uplink signal, for the sake of a suitable time for reception by the base station side, the mobile terminal UE 1 needs to transmit the uplink signal T_a1 ahead the time point of receiving the uplink signal. With respect to the mobile terminal UE 2, the time advance is T_a2.

Specifically, a terminal side reserves a TA value. After the base station side specifies that in which subframe the mobile terminal transmits the uplink signal, the mobile terminal calculates a transmission time point according to the TA value, and sends the uplink signal at the calculated time point. For example, if the base station side instructs the mobile terminal to transmit an uplink signal in an $m^{th}$ subframe, the mobile terminal first calculates, according to reception time of a downlink signal, that a signal transmitted at the beginning of the $m^{th}$ subframe will be received by the terminal a period of T1 later. In this case, the time for the terminal to send the uplink signal is the time point T1-TA.

The base station constantly measures the time when the uplink signal of the mobile terminal arrives at the base station, judges whether it is suitable for reception, and then notify, by using downlink signaling, the mobile terminal whether the TA value should be increased or decreased.

The same as the above-described power control, time control is also affected by a new network structure. For example, if only one base station is used for reception, the TA value should be selected according to time suitable for the signal to arrive at the base station; however, if a plurality of base stations are used for joint reception, the TA value should be selected according to time suitable for joint reception by these base stations.

Analogous to the above-described control of transmit power of an uplink signal, a plurality of TA values are maintained for each mobile terminal, where each TA value is directed to a receiving manner. When the base station side instructs the mobile terminal to transmit an uplink signal, the serving base station instructs the mobile terminal to select a suitable TA value.

In this embodiment, a serving base station sends, according to a receiving manner of a base station side, an instruction to instruct a mobile terminal to select a TA value, so that the mobile terminal is capable of transmitting an uplink signal at suitable time. In this way, time control requirements of new network topology structures such as a plurality of base stations jointly covering a cell are met.

Accordingly, a method for receiving an uplink signal transmitted by a terminal according to an embodiment of the present invention includes:

selecting a time advance value from a plurality of time advance values according to a receiving manner in which a base station side receives an uplink signal;

sending, based on the selected time advance value, an instruction for determining a time advance value to a terminal, where the instruction is used for instructing the terminal to transmit an uplink signal at an advanced time point corresponding to the selected time advance value; and receiving the uplink signal sent by the terminal.

The foregoing operations may be performed by a serving base station of the terminal transmitting the uplink signal.

In this embodiment, a serving base station sends, according to a receiving manner of a base station side, an instruction to instruct a mobile terminal to select a TA value, so that the mobile terminal is capable of transmitting an uplink signal at suitable time. In this way, time control requirements of new network topology structures such as a plurality of base stations jointly covering a cell are met.

Persons of ordinary skill in the art may understand that all or part of steps according to the embodiments of the present invention may be implemented by a program instructing relevant hardware. The program may be stored in a computer readable storage medium. When the program is executed, the steps of the method in the embodiment are executed. The storage medium includes various mediums, such as a ROM, a RAM, a magnetic disk, or an optical disk, which are capable of storing program code.

Figure 6:
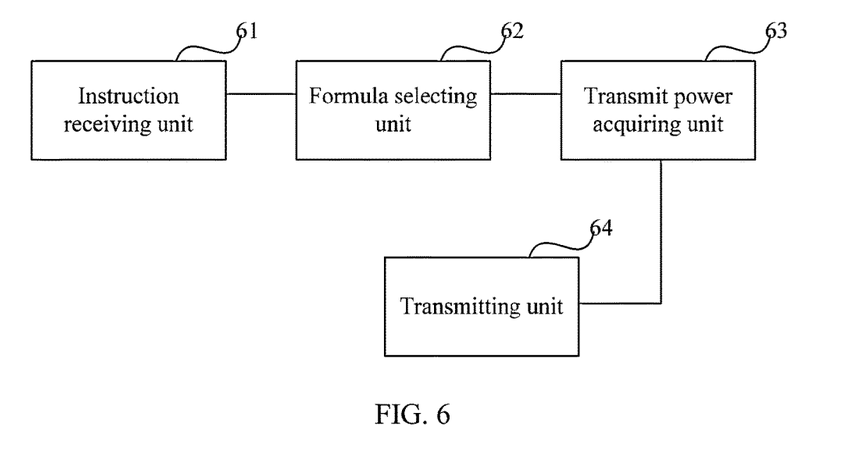
FIG. 6 is a schematic structural diagram of a terminal according to an embodiment of the present invention.

FIG. 6 is a schematic structural diagram of a terminal according to an embodiment of the present invention. As illustrated in FIG. 6, the terminal includes: an instruction receiving unit 61, a formula selecting unit 62, a transmit power acquiring unit 63, and a transmitting unit 64.

The instruction receiving unit 61 is configured to receive an instruction sent by a serving base station and used for determining transmit power; the formula selecting unit 62 is configured to select an uplink power control formula from a plurality of uplink power control formulas according to the instruction; the transmit power acquiring unit 63 is configured to obtain transmit power of a current uplink signal by using the selected uplink power control formula; and the transmitting unit 64 is configured to transmit an uplink signal by using the obtained transmit power.

The instruction received by the instruction receiving unit 61 may be determined by the serving base station according to a receiving manner in which a base station side receives an uplink signal. The instruction received by the instruction receiving unit may be a configuration parameter of a non-periodical SRS.

The formula selecting unit 62 is specifically configured to select, according to the instruction, an uplink power control formula from a plurality of uplink power control formulas with variables totally independently configured; or is specifically configured to select, according to the instruction, an uplink power control formula from a plurality of uplink power control formulas with variables partially independently configured; or is specifically configured to select, according to the instruction, an uplink power control formula from a plurality of uplink power control formulas with identical variables but carrying different offsets.

The transmit power acquiring unit 63 may further include: a first power receiving subunit and a first power acquiring subunit. The first power receiving subunit is configured to receive respective target receive power transmitted by base stations jointly receiving the uplink signal; and the first power acquiring subunit is configured to obtain, by using the selected uplink power control formula and the target receive power transmitted by the base stations, transmit power of the uplink signal suitable for joint reception.

Alternatively, the transmit power acquiring unit 63 further includes: a second power receiving subunit and a second power acquiring subunit. The second power receiving subunit is configured to receive a target power value that is sent by the serving base station and suitable for joint reception, where the target power value is obtained by negotiation by the base stations jointly receiving the uplink signal; and the second power acquiring subunit is configured to obtain, by using the selected uplink power control formula and the received target power value, transmit power suitable for joint reception.

The instruction receiving unit 61 may include: a signaling receiving subunit and an instruction determining subunit. The signaling receiving subunit is configured to receive a downlink PDCCH delivered by the serving base station; and the instruction determining subunit is configured to learn, by using an information bit preset in the downlink PDCCH or a DCI format of the downlink PDCCH, the instruction for determining transmit power.

According to the terminal embodiment, a terminal selects, by using a formula selecting unit, an uplink power control formula from a plurality of uplink power control formulas according to an instruction sent by a serving base station, so that the terminal is not only capable of selecting, according to a receiving manner, a corresponding uplink power control formula to determine a transmit signal, but also capable of using a corresponding uplink power control formula for a different configuration parameter of a non-periodical SRS to determine suitable transmit power to transmit an uplink signal. In this way, power control requirements in current different receiving manners are met, flexibility of uplink transmit power control of the terminal is improved, and signal transmission performance of the terminal is also improved.

Figure 7:
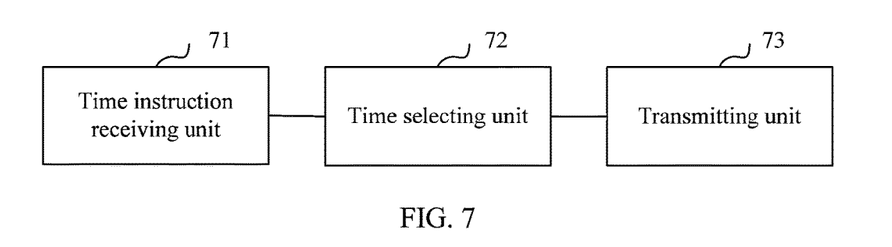
FIG. 7 is a schematic structural diagram of another terminal according to an embodiment of the present invention.

FIG. 7 is a schematic structural diagram of another terminal according to an embodiment of the present invention. As illustrated in FIG. 7, a mobile terminal includes: a time instruction receiving unit 71, a time selecting unit 72, and a transmitting unit 73.

The time instruction receiving unit 71 is configured to receive an instruction sent by a serving base station and used for determining a TA value as time for transmitting an uplink signal, where the instruction is determined by the serving base station according to a receiving manner in which a base station side receives an uplink signal; the time selecting unit 72 is configured to select a TA value from a plurality of TA values according to the instruction; and the transmitting unit 73 is configured to transmit the uplink signal to the serving base station at an advanced time point corresponding to the selected TA value. For details, reference may be made to the description in the embodiment illustrated in FIG. 4.

In this embodiment, a terminal receives, by using a time instruction receiving unit, an instruction sent, according to a receiving manner, by a serving base station and used for determining a TA value, selects a TA value by using a time selecting unit, and transmits an uplink signal by using a transmitting unit at a time point corresponding to the selected TA value, so that the terminal is capable of transmitting the uplink signal at suitable time. In this way, time control requirements of new network topology structures such as a plurality of base stations jointly covering a cell are met.

Figure 8:
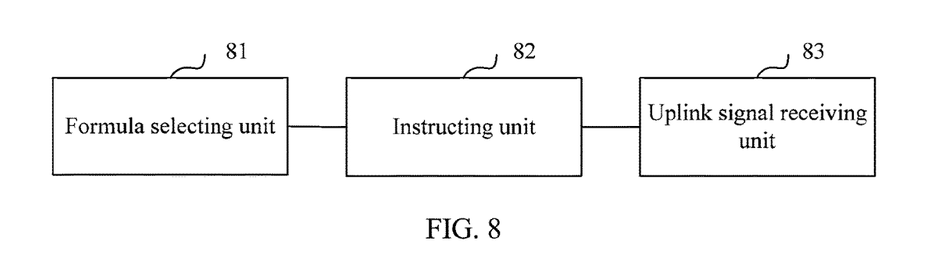
FIG. 8 is a schematic structural diagram of a base station according to an embodiment of the present invention.

FIG. 8 is a schematic structural diagram of a base station according to an embodiment of the present invention. As illustrated in FIG. 8, the base station includes: a formula selecting unit 81, an instructing unit 82, and an uplink signal receiving unit 83.

The formula selecting unit 81 is configured to select an uplink power control formula from a plurality of uplink power control formulas according to a receiving manner in which a base station side receives an uplink signal.

The instructing unit 82 is configured to send, based on the selected uplink power control formula, an instruction for determining transmit power to a terminal, where the instruction is used for instructing the terminal to obtain transmit power of an uplink signal by using the selected uplink power control formula. For example, the instructing unit 82 may be specifically configured to send a downlink physical downlink control channel PDCCH to the terminal, where an information bit preset in the downlink PDCCH serves as the instruction, or a DCI format of the downlink PDCCH serves as the instruction.

The uplink signal receiving unit 83 is configured to receive an uplink signal sent by the terminal.

According to this embodiment, a base station selects, by using a formula selecting unit, an uplink power control formula from a plurality of uplink power control formulas according to a receiving manner in which a base station side receives an uplink signal, and sends the selected uplink power control formula to a terminal by using an instructing unit, so that the terminal is not only capable of selecting, according to the receiving manner, a corresponding uplink power control formula to determine a transmit signal, but also capable of using a corresponding uplink power control formula for a different configuration parameter of a non-periodical SRS to determine suitable transmit power to transmit an uplink signal. In this way, power control requirements in current different receiving manners are met, flexibility of uplink transmit power control of the terminal is improved, and signal transmission performance of the terminal is also improved.

Figure 9:
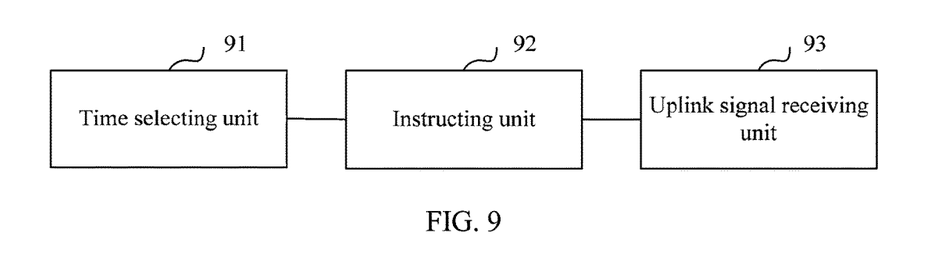
FIG. 9 is a schematic structural diagram of another base station according to an embodiment of the present invention.

FIG. 9 is a schematic structural diagram of another base station according to an embodiment of the present invention. As illustrated in FIG. 9, the base station includes: a time selecting unit 91, an instructing unit 92, and an uplink signal receiving signal 93.

The time selecting unit 91 is configured to select a time advance (TA) value from a plurality of time advance values according to a receiving manner in which a base station side receives an uplink signal; the instructing unit 92 is configured to send, based on the selected time advance value, an instruction for determining a time advance value to a terminal, where the instruction is used for instructing the terminal to transmit an uplink signal at an advanced time point corresponding to the selected time advance value; and the uplink signal receiving unit 93 is configured to receive the uplink signal sent by the terminal.

In this embodiment, a base station sends, by using a time selecting unit and an instructing unit according to a receiving manner of a base station side, an instruction to instruct a mobile terminal to select a TA value, so that the mobile terminal is capable of transmitting an uplink signal at suitable time. In this way, time control requirements of new network topology structures such as a plurality of base stations jointly covering a cell are met.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, without departing from the spirit and scope of the technical solutions of the embodiments of the present invention. For example, the embodiments of the present invention are described by using a mobile terminal as an example. However, in practice, the above technical solutions may also be applied to a fixed terminal.

What is claimed is:

1. A method for a terminal to transmit an uplink signal to a serving base station and at least another base station, the method comprising:
    receiving an instruction sent from the serving base station (BS) for the terminal to determine a transmit power of a sounding reference signal (SRS) for sending to the serving base station and the at least another base station, wherein the instruction includes information for either jointly transmitting the SRS to more than one of the at least two base stations, or independently transmitting the SRS to each of the at least two base stations;
    selecting an uplink power control formula from a plurality of uplink power control formulas at the terminal according to whether the SRS is to be transmitted jointly or independently;
    receiving respective target power values from the serving base station and the at least another base station or receiving a target power value from the serving base station that is a value negotiated between the serving base station and the at least another base station;
    obtaining the transmit power suitable for jointly transmitting the SRS by:
        a) using the selected uplink power control formula and the respective target power values; or
        b) using the selected uplink power control formula and the target power value from the serving base station; and
    jointly or individually transmitting the SRS to the serving base station and the at least another base station based on the received instruction.

2. The method according to claim 1, wherein selecting the uplink power control formula from the plurality of uplink power control formulas according to the instruction comprises:

selecting, according to the instruction, an uplink power control formula from a plurality of uplink power control formulas whose variables are independently configured; or selecting, according to the instruction, an uplink power control formula from a plurality of uplink power control formulas whose variables are partially independently configured.

3. The method according to claim 1, wherein receiving the instruction sent by the serving base station for determining transmit power comprises:

receiving a downlink physical downlink control channel (PDCCH) delivered by the serving base station; and determining the configuration parameter by using an information bit preset in the downlink PDCCH, or determining the configuration parameter by using a downlink control information format of the downlink PDCCH.

4. A terminal comprising:

a processor, and a memory storing processor-executable instructions which, when executed by the processor, cause the processor to implement operations including:

receiving an instruction sent from a serving base station (B S) for the terminal to determine a transmit power of a sounding reference signal (SRS) for sending to more than one B S, wherein the instruction includes information for either jointly transmitting the SRS to more than one of the at least two base stations or independently transmitting the SRS to each of the at least two base stations;

selecting an uplink power control formula from a plurality of uplink power control formulas at the terminal according to whether the SRS is to be transmitted jointly or independently;

receiving respective target power values from the serving base station and at least another base station or receiving a target power value from the serving base station that is a value negotiated between the serving base station and the at least another base station;

obtaining the transmit power suitable for jointly transmitting the SRS by:

a) using the selected uplink power control formula and the respective target power values; or b) using the selected uplink power control formula and the target power value from the serving base station; and jointly or individually transmitting the SRS to the serving base station and the at least another base station based on the received instruction.

5. The terminal according to claim 4, wherein the processor is further configured to:

select, according to the instruction, an uplink power control formula from a plurality of uplink power control formulas whose variables are independently configured; or select, according to the instruction, an uplink power control formula from a plurality of uplink power control formulas whose variables are partially independently configured.

6. The terminal according to claim 4, wherein the processor is further configured to:

receive a downlink physical downlink control channel (PDCCH) delivered by the serving base station; and a) determine the configuration parameter by using an information bit preset in the downlink PDCCH, or b) determine the configuration parameter by using a downlink control information format of the downlink PDCCH.

7. A serving base station in a communications system that is among a plurality of base stations, the serving base station comprising:

a processor, and a memory storing processor-executable instructions which when executed by the processor cause the processor to implement operations including:

selecting an uplink power control formula from a plurality of uplink power control formulas used for obtaining a transmit power of a sounding reference signal (SRS) to be sent to the serving base station and at least one other base station in the communications system, wherein the selection is at least in part based on whether the SRS is to be jointly transmitted to the serving base station and the at least one other base station or independently transmitted to each of the serving base station and the at least one other base station;

sending to a terminal, based on the selected uplink power control formula, an instruction for determining the transmit power of the SRS for sending to the serving base station and the at least one other base station, wherein the instruction includes:

a) a target transmit power value of the SRS from the terminal to the serving base station suitable for reception by the serving base station, wherein the target transmit power value is determined by the terminal from several target transmit power values sent to the terminal by the plurality of base stations in the communications system to enable the terminal to select the target transmit power value suitable for joint reception of the SRS by the serving base station and the at least one other base station, and wherein the plurality of base stations providing the several target transmit power values use the selected uplink power control formula to determine the several target transmit powers values from the plurality of base stations, or b) a target transmit power value of the SRS suitable for joint reception by the base station and the at least one other base station, wherein the target power value is obtained by negotiating target transmit powers of the at least one other base station so that the terminal is able to select the transmit power value suitable for joint reception using the selected uplink power control formula and the target power value; and receiving the SRS sent by the terminal according to the selected transmit power value.

8. The base station of claim 7, wherein the processor is further configured to select the uplink power control formula from the plurality of uplink power control formulas according to the instruction by:

selecting, according to the instruction, an uplink power control formula from a plurality of uplink power control formulas whose variables are independently configured; or selecting, according to the instruction, an uplink power control formula from a plurality of uplink power control formulas whose variables are partially independently configured.

9. The base station of claim 7, wherein the processor is further configured, when sending to the terminal the instruction including the configuration parameter, to send the instruction on a downlink physical downlink control channel (PDCCH), wherein an information bit preset in the downlink PDCCH serves as the instruction for the configuration parameter, or a downlink control information (DCI) format of the downlink PDCCH serves as the instruction for the configuration parameter.

\* \* \* \* \*